United States Patent
Zaum et al.

(10) Patent No.: US 10,824,154 B2
(45) Date of Patent: Nov. 3, 2020

(54) METHOD AND DEVICE FOR OPERATING AN AUTOMATED MOBILE SYSTEM

(71) Applicant: Robert Bosch GmbH, Stuttgart (DE)

(72) Inventors: Daniel Zaum, Sarstedt (DE); Holger Mielenz, Ostfildern (DE); Jan Rohde, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 263 days.

(21) Appl. No.: 16/006,439

(22) Filed: Jun. 12, 2018

(65) Prior Publication Data

US 2019/0041862 A1 Feb. 7, 2019

(30) Foreign Application Priority Data

Aug. 2, 2017 (DE) .......... 10 2017 213 390

(51) Int. Cl.
*G05D 1/02* (2020.01)
*G01C 21/34* (2006.01)

(52) U.S. Cl.
CPC ....... *G05D 1/0214* (2013.01); *G01C 21/3461* (2013.01); *G05D 1/0212* (2013.01); *G05D 2201/0212* (2013.01); *G05D 2201/0213* (2013.01)

(58) Field of Classification Search
CPC .......... G05D 1/0214; G05D 1/0212; G05D 2201/0212; G05D 2201/0213; G01C 21/3461

See application file for complete search history.

(56) References Cited

U.S. PATENT DOCUMENTS

2014/0088855 A1* 3/2014 Ferguson ............ G08G 1/166
 701/117
2016/0357188 A1* 12/2016 Ansari ............ G06K 9/00805

* cited by examiner

*Primary Examiner* — Michael D Lang
(74) *Attorney, Agent, or Firm* — Norton Rose Fulbright US LLP; Gerard Messina

(57) ABSTRACT

A method for operating an automated mobile system includes determining a first trajectory based on driving environment data recorded by a sensor system of the system, determining at least a permissible second trajectory from a defined data source that is independent of the sensor system, comparing the planned, first trajectory to the at least one second trajectory, and, in response to a defined deviation of the planned first trajectory from the at least one permissible second trajectory, determining the first trajectory in a process modified in a defined manner.

15 Claims, 1 Drawing Sheet

METHOD AND DEVICE FOR OPERATING AN AUTOMATED MOBILE SYSTEM

CROSS-REFERENCE TO RELATED APPLICATIONS

The present application claims priority under 35 U.S.C. § 119 to DE 10 2017 213 390.2, filed in the Federal Republic of Germany on Aug. 2, 2017, the content of which is hereby incorporated by reference herein in its entirety.

FIELD OF THE INVENTION

The present invention relates to a method for operating an automated mobile system. The present invention also relates to a device for operating an automated mobile system. In addition, the present invention relates to a computer program product.

BACKGROUND

A plurality of approaches are known for planning the behavior of mobile automated systems. A planning of this kind, such as planning a lane change or approaching an intersection at low visibility is crucial for automated mobile systems, for example, in the form of automated vehicle systems, especially in automated urban traffic. Errors in behavior planning can thereby have serious, disadvantageous consequences.

SUMMARY

It is an object of the present invention to provide an improved method for operating an automated mobile system.

According to an example embodiment of the present invention, a method for operating an automated mobile system includes determining a first trajectory based on driving environment data recorded by a sensor system of the system; determining at least a second trajectory for the system based on a defined data source that is independent of the sensor system; comparing the first trajectory to the at least one permissible second trajectory; and, in response to a defined deviation of the first trajectory from the at least one second trajectory, modifying the determination of the first trajectory in a defined manner.

This makes it possible to facilitate a "robust" planning for the operation of the mobile automated system and thereby significantly reduce an error probability during operation. The provided method is especially useful when the automated system is operated in an urban driving environment, making it possible to essentially compensate for sensor system malfunctions.

According to an example embodiment, a device for operating an automated mobile system includes a sensor system for recording driving environment data of the system; a planning element for planning a first trajectory based on driving environment data of the system recorded by the sensor system; at least one further data source that is independent of the sensor system for determining at least one further trajectory for the system; and a control device for comparing the first trajectory to the at least one second trajectory; and, in response to a defined deviation of the first trajectory from the at least one second trajectory, modifying a determination of the first trajectory in a defined manner.

An advantageous embodiment of the method provides that a digital planning map be used to determine the at least one second trajectory. Because the planning map is independent of the sensor system, a different data source can be used to determine a trajectory for the automated mobile system. In this manner, the data for determining the first and second trajectory are advantageously mutually uncorrelated, making possible an effective control mechanism for the first planned trajectory.

Another advantageous embodiment of the method provides that the at least one permissible second trajectory be determined using data from an observation of further moving systems in the driving environment field of the automated mobile system. Another type of independent information source is thereby advantageously provided. This makes it possible to ascertain a deviation in one's own planned trajectory from trajectories of other traffic participants on the basis of an observed behavior of other traffic participants, thereby facilitating a reprogramming of the trajectory for the automated mobile system.

Another advantageous embodiment of the method provides that the automated mobile system be placed in a defined, degraded state in response to a defined deviation between the first trajectory and the at least one second trajectory. An enhanced operational reliability is thereby facilitated in the entire system having a plurality of automated mobile systems.

Another advantageous embodiment of the method provides that a danger-minimized trajectory be determined for the automated mobile system in the degraded state. This makes it advantageously possible to substantially avoid a collision between the automated mobile systems or essentially prevent another type of unfavorable dangerous situation for the automated mobile system.

Another advantageous embodiment of the method provides that a Hausdorff distance measure be used as a measure of a deviation between the first trajectory and the at least one second trajectory. In this manner, a generally known similarity measure between two sets is used to quantify the deviation between the planned trajectory and the at least one permissible second trajectory in order to derive suitable follow-up actions therefrom.

The present invention is described in greater detail in the following on the basis of two figures, with reference to other features and advantages. In this context, all of the described or represented features, either alone or in any combination, constitute the subject matter of the present invention, regardless of the manner in which they are combined in the claims and regardless of the antecedents thereof, as well as independently of the formulation or presentation thereof in the description or in the figures.

Described method features are derived analogously from corresponding described device features and vice versa. In particular, this means that features, technical advantages, and embodiments of the method for operating an automated mobile system are analogously derived from corresponding embodiments, features, and advantages of the device for operating an automated mobile system and vice versa.

DETAILED DESCRIPTION

Embodiments of the present invention is provide a type of "control instance" for planning a trajectory of an automated mobile system. A data source that is independent of a sensor system is thereby used to check the provided, planned trajectory. This facilitates a robust planning of the trajectory, in particular, making possible a suitable response to a malfunction and/or a non-operation of the sensor system, thereby enhancing the reliability of an operation of the automated mobile system.

Figure 1:
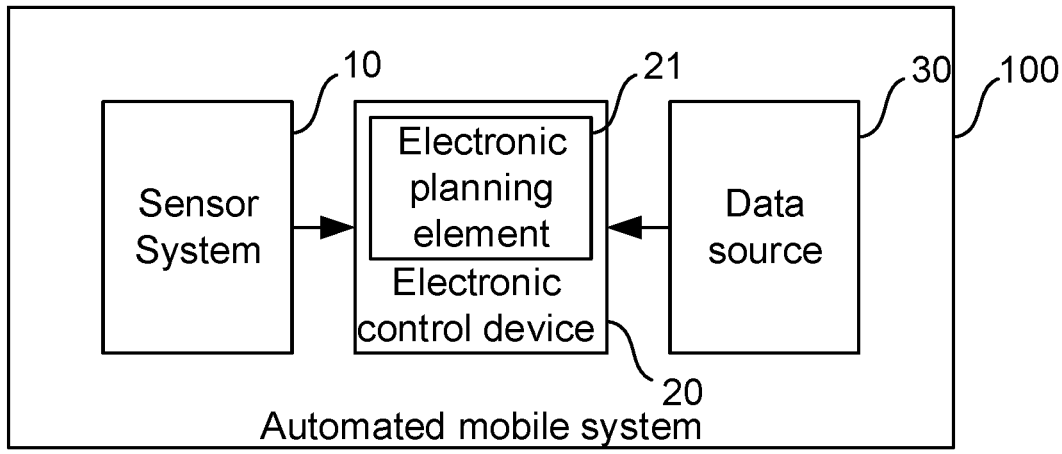
FIG. 1 is a schematic block diagram of a device for operating an automated mobile system, according to an example embodiment of the present invention.

FIG. 1 shows a block diagram of a device for operating an automated mobile system 100, for example, in the form of an automated vehicle. Synonymously, an automated vehicle can also be understood to be a partially automated vehicle, an autonomous vehicle, and a partially autonomous vehicle.

A sensor system 10 in automated mobile system 100 records a driving environment field (for example, traffic lights, traffic signs, infrastructure, etc.) of automated mobile system 100. Sensor system 10 is functionally linked to an electronic control device 20 that features an electronic planning element 21. On the basis of the driving environment data ("driving environment model") determined by sensor system 10 and ascertained position finding data, planning element 21 determines or plans a first trajectory for automated mobile system 100. In addition, data from a data source 30 that is independent of sensor system 10 is fed to planning element 21. At least one further permissible trajectory for automated mobile system 100 can thereby be ascertained or planned from the data of further data source 30.

Data source 30 can be in the form of a digital planning map that is sent via a communication interface (for example, a wireless interface, not shown) from an external device (not shown) to device 100 for operating the automated mobile system. The mentioned data for the digital planning map can thereby be transmitted at the beginning and/or also in real time during operation of automated mobile system 100.

Alternatively and/or additionally, further data source 30 can also be a data store of data that originate from an observation of further participants in the automated system. Trajectories of other participants can be thereby ascertained, for example, in the form of other automated vehicles in the driving environment field of automated mobile system 100.

The ascertained first trajectory and the at least one further permissible second trajectory are then compared in a matching process. In this instance, the Hausdorff distance measure can be used as a measure of a deviation between the first trajectory and the at least one second trajectory. Also suited, however, are other known measures of deviations among defined sets.

In the case of a defined deviation between the planned first trajectory and the at least one further second trajectory, control device 20 ascertains a defined degraded state of automated mobile system 100, and automated mobile system 100 is placed in the degraded state.

For example, a danger-minimized trajectory can be planned, and/or a velocity reduced, and/or a warning signal emitted, etc., implemented for automated mobile system 100 in the degraded state. This can be implemented by at least one of the assistance systems of automated mobile system 100 mentioned in the following: emergency braking assistance system, pedestrian avoidance assistance system, crossing traffic assistance system, etc.

For example, in the case that sensor system 10 does not or does not correctly recognize a light-signaling device, a practical application provides that the determination of the first trajectory be modified in a defined manner to the effect that the first trajectory not be determined on the basis of the data from independent data source 30.

Moreover, this makes it possible to allow for not determining or not recognizing driving situations (for example, crossings) by traversing vehicles and/or for recognizing specific objects (such as traffic lights, certain types of traffic signs, etc.) by reprogramming the first trajectory for automated mobile system 100 accordingly.

Figure 2:
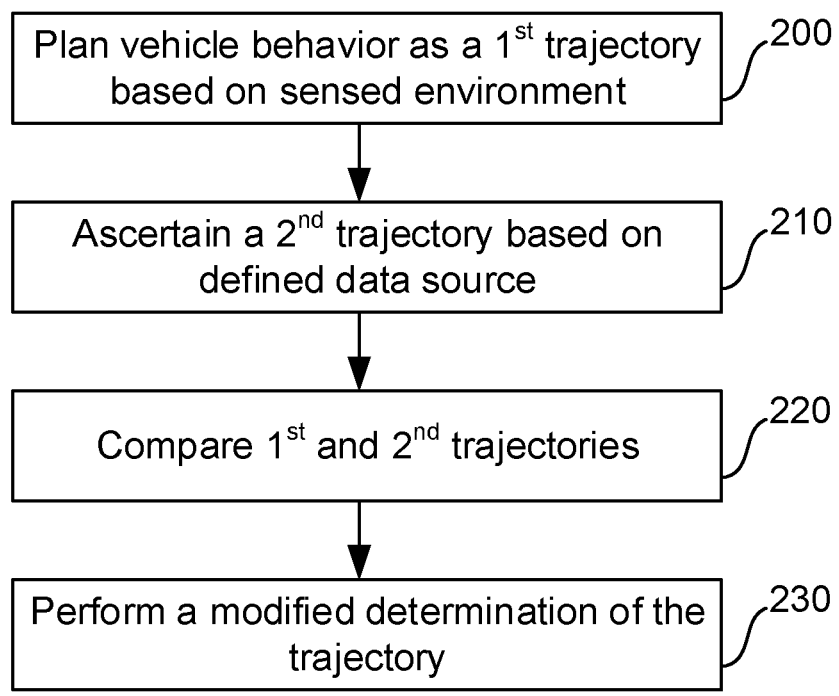
FIG. 2 is a flowchart that illustrates a method according to an example embodiment of the present invention.

FIG. 2 shows a basic sequence of the described method, according to an example embodiment. In a step 200, a behavior planning is performed for automated mobile system 100, a first trajectory being output. The first trajectory is ascertained based on driving environment data recorded by a sensor system 10 of system 100.

Subsequently thereto, the previously planned behavior is matched to a set of permissible behavior variants. This means that at least one permissible second trajectory is ascertained in a step 210 based on a defined data source that is independent of sensor system 10.

In a step 220, the planned first trajectory is compared to the at least one permissible second trajectory. In a step 230, a defined modified determination of the first trajectory is made in response to a defined deviation of the planned first trajectory from the at least one permissible second trajectory.

In an advantageous variant of the provided method, the at least one permissible second trajectory is determined by a digital planning map in step 210. Alternatively and/or additionally, the at least one permissible second trajectory is determined using data from an observation of further mobile systems in the driving environment field of automated mobile system 100. The observation data from the other traffic participants can thereby be determined using generally known systems, such as radar, lidar, video, or ultrasonic sensor systems.

The method envisaged here advantageously facilitates a robust trajectory planning of automated mobile systems, for example, in the form of automated vehicle systems, logistics vehicles, machine tools, and the like.

The provided method advantageously makes possible an early detection of an erroneously planned first trajectory and an appropriate reaction thereto.

In the variant that provides for observing the other participants of the automated mobile system, a first system embodiment provides that the behavior of the other devices in the driving environment be compared to one's own behavior and/or analyzed for deviations from one's own expected behavior. If significant differences, for example, in a driven velocity, are discerned, then errors in one's own behavior planning can be recognized.

In another advantageous system embodiment of observing the other participants in the automated mobile system, the behavior of the other traffic participants is analyzed for irregularities. Such irregularities include, for example, considerable delays of other vehicles in the immediate driving environment of one's own vehicle. Such observations are subsequently used, for example, to begin a separate analysis procedure for recognizing errors in the behavior planning.

The result is that the provided method makes it possible to advantageously enhance the safety level in road traffic and provide a homogeneous traffic flow. Moreover, a first estimate for an avoidance maneuver to be planned can be obtained from the behavior of the other traffic participants.

The provided method can influence or optimize a computing capacity of control units, for example, by executing exclusively required, and not all, algorithms for an object detection and/or for sensor systems and/or for a driver assistance. A computing capacity can thereby target a sensing capacity of sensor system 10, for example, in order to thereby temporarily provide an improved sensing of obstacles on the roadway.

The inventive method can advantageously be implemented as software executed, for example, on control device 20 using planning element 21. A simple adaptability of the method is thereby facilitated.

In summary, the present invention provides a method for operating an automated mobile system that makes possible an improved, more reliable planning of a trajectory for the automated mobile system. The provided method advantageously makes it possible to reduce an error probability in the planning of the first trajectory. This is primarily achieved by implementing an information acquisition or data processing on the basis of a plurality of statistically independent information sources. This prevents a propagation of an error in one of the information sources.

One skilled in the art will suitably alter the features of the present invention or combine them with one another without departing from the spirit and scope of the present invention.

What is claimed is:

1. A method for operating an automated vehicle, the method comprising:
    determining a first trajectory along which to guide the automated vehicle, the determination of the first trajectory being based on a driving environment of the automated vehicle as determined based on first data recorded by a sensor system of the automated vehicle;
    determining a second trajectory along which to guide the automated vehicle, the determination of the second trajectory being based on the driving environment of the automated vehicle as determined based on data of a defined data source that is independent of the sensor system;
    comparing the first trajectory to the second trajectory; and
    in response to determining, based on a result of the comparing, a defined deviation of the first trajectory from the second trajectory:
        determining a third trajectory along which to guide the automated vehicle, wherein:
            the determination of the first trajectory is performed using a first trajectory determination algorithm and the determination of the third trajectory is performed using a second trajectory determination algorithm; and/or
            the first data recorded by the sensor system on the basis of which the first trajectory is determined is generated by a first subset of sensors of the sensor system and the determination of the third trajectory is based on the driving environment of the automated vehicle determined based on second data that is generated by a second subset of the sensors of the sensor system that is different than the first subset of the sensors; and
        controlling maneuvers of the automated vehicle according to the determined third trajectory.

2. The method of claim 1, wherein the defined data source is a digital planning map.

3. The method of claim 1, wherein the defined data source is data from an observation of moving systems in a driving environment field of the automated vehicle.

4. The method of claim 1, further comprising, in response to the defined deviation between the first trajectory and the second trajectory, placing the automated vehicle in a predefined, degraded state.

5. The method of claim 4, wherein the determination of the first trajectory is performed using the first trajectory determination algorithm and the third trajectory is performed using the second trajectory determination algorithm, and the second trajectory determination algorithm is configured to generate the third trajectory as a danger-minimized trajectory for use by the automated vehicle in the degraded state.

6. The method of claim 1, wherein the defined deviation is determined using, in the comparing, a Hausdorff distance measure as a measure of a deviation between the first trajectory and the second trajectory.

7. The method of claim 1, wherein the defined data source is one or more sensors of other vehicles that also sense the driving environment of the automated vehicle when the sensor system of the automated vehicle records the first data.

8. The method of claim 1, wherein the determination of the first trajectory is performed using the first trajectory determination algorithm and the determination of the third trajectory is performed using the second trajectory determination algorithm.

9. The method of claim 8, wherein the first trajectory determination algorithm is configured to generate trajectories such that according to which one or more of the sensors of the sensor system of the automated vehicle are required for the controlling of the maneuvers, and the second trajectory determination algorithm is configured to generate trajectories according to which the one or more of the sensors of the sensor system of the automated vehicle are not required for the controlling of the maneuvers.

10. The method of claim 1, wherein the first data recorded by the sensor system on the basis of which the first trajectory is determined is generated by the first subset of sensors of the sensor system and the determination of the third trajectory is based on the driving environment of the automated vehicle that is determined based on the second data that is generated by the second subset of the sensors of the sensor system that is different than the first subset of the sensors.

11. The method of claim 10, wherein the second subset of the sensors includes the first subset of the sensors plus one or more additional ones of the sensors of the sensor system.

12. A device for operating an automated vehicle, comprising:
    a sensor system;
    a data source that is independent of the sensor system; and
    a control device, wherein the control device is configured to:
        determine a first trajectory along which to guide the automated vehicle, the determination of the first trajectory being based on a driving environment of the automated vehicle as determined based on first data recorded by the sensor system of the automated vehicle;
        determine a second trajectory along which to guide the automated vehicle, the determination of the second trajectory being based on the driving environment of the automated vehicle as determined based on data of the data source;
        compare the first trajectory to the second trajectory;
        in response to a determination, based on a result of the comparison, that there is a defined deviation of the first trajectory from the second trajectory:
            determine a third trajectory along which to guide the automated vehicle, wherein:
                the determination of the first trajectory is performed using a first trajectory determination algorithm and the determination of the third trajectory is performed using a second trajectory determination algorithm; and/or the first data recorded by the sensor system on the basis of which the first trajectory is determined is generated by a first subset of sensors of the sensor system and the determination of the third trajectory is based on the driving environment of the automated vehicle determined based on second data that is generated by a second subset of the sensors of the sensor system that is different than the first subset of the sensors; and control maneuvers of the automated vehicle according to the determined third trajectory; and in response to a determination, based on the result of the comparison, that there is not the defined deviation between of the first trajectory from the second trajectory, control the maneuvers of the automated vehicle according to the determined first trajectory.

13. The device of claim 12, wherein the data source is a digital planning map.

14. The device of claim 12, wherein the data source includes data from an observation of moving systems in a driving environment field of the automated vehicle.

15. A non-transitory computer-readable medium on which are stored instructions that are executable by a processor for operating an automated vehicle to cause the processor to be configured to:

determine a first trajectory along which to guide the automated vehicle, the determination of the first trajectory being based on a driving environment of the automated vehicle as determined based on first data recorded by a sensor system of the automated vehicle;

determine a second trajectory along which to guide the automated vehicle, the determination of the second trajectory being based on the driving environment of the automated vehicle as determined based on data of a defined data source that is independent of the sensor system;

compare the first trajectory to the second trajectory;

in response to a determination, based on a result of the comparison, that there is a defined deviation of the first trajectory from the second trajectory:

determine a third trajectory along which to guide the automated vehicle, wherein:

the determination of the first trajectory is performed using a first trajectory determination algorithm and the determination of the third trajectory is performed using a second trajectory determination algorithm; and/or the first data recorded by the sensor system on the basis of which the first trajectory is determined is generated by a first subset of sensors of the sensor system and the determination of the third trajectory is based on the driving environment of the automated vehicle determined based on second data that is generated by a second subset of the sensors of the sensor system that is different than the first subset of the sensors; and control maneuvers of the automated vehicle according to the determined third trajectory; and in response to a determination, based on the result of the comparison, that there is not the defined deviation between of the first trajectory from the second trajectory, control the maneuvers of the automated vehicle according to the determined first trajectory.

* * * * *